(12) United States Patent
Braun et al.

(10) Patent No.: US 7,963,883 B2
(45) Date of Patent: Jun. 21, 2011

(54) PROPULSION SYSTEM FOR SKIDDER

(75) Inventors: Kevin G. Braun, Dubuque, IA (US); Andrew Quinn, Peosta, IA (US); Todd Velde, Dubuque, IA (US); Borislav Trifunovic, Durango, IA (US)

(73) Assignee: Deere & Company, Moline, IL (US)

( * ) Notice: Subject to any disclaimer, the term of this patent is extended or adjusted under 35 U.S.C. 154(b) by 744 days.

(21) Appl. No.: 11/972,128

(22) Filed: Jan. 10, 2008

(65) Prior Publication Data

US 2009/0181822 A1 Jul. 16, 2009

(51) Int. Cl.
*B60W 10/06* (2006.01)
(52) U.S. Cl. .......................................... 477/107; 475/110
(58) Field of Classification Search .................. 477/107, 477/110, 115, 124
See application file for complete search history.

(56) References Cited

U.S. PATENT DOCUMENTS

| | | | |
|---|---|---|---|
| 4,740,898 A * | 4/1988 | McKee et al. | 701/70 |
| 5,315,972 A * | 5/1994 | Judy et al. | 123/198 D |
| 5,526,261 A * | 6/1996 | Kallis et al. | 701/51 |
| 6,240,356 B1 * | 5/2001 | Lapke | 701/93 |
| 6,394,931 B1 * | 5/2002 | Genise | 477/97 |
| 6,581,710 B2 * | 6/2003 | Sprinkle et al. | 180/178 |

* cited by examiner

*Primary Examiner* — Ha D. Ho
(74) *Attorney, Agent, or Firm* — Taylor IP, P.C.

(57) ABSTRACT

A skidder having a diesel engine coupled to a multiple gear ratio transmission driving a pair of wheel sets for a skidder. The diesel engine is controlled by an operator manipulated foot pedal or hand lever to control the power output and ultimately the maximum skidder ground speed. A controller is provided to pre-select the maximum gear into which the transmission may be placed to ultimately limit the maximum ground speed of the skidder so that the operator sets the forward speed in a binary fashion by depressing the foot pedal or hand operated device to a maximum output condition.

18 Claims, 1 Drawing Sheet

PROPULSION SYSTEM FOR SKIDDER

FIELD OF THE INVENTION

The invention relates to a skidder and more specifically to a propulsion system for such skidder.

BACKGROUND OF THE INVENTION

In industrial vehicles known as skidders have been in use for many years serving the function of pulling felled trees from a logging site to a landing where they can be conveyed to a facility for processing the wood. Skidders originally involved vehicles having a chain connected to the log to drag it out of the logging site but have evolved to skidders where they have grapple hooks to physically hold the felled timber to carry it out. Skidders have been developed to enhance operator efficiency, safety and productivity in spite of the arduous duty cycles demanded of skidders.

One of the problems with skidders is that they must operate over a highly irregular terrain, caused mainly by the stumps of logs or trees that have already been felled. The terrain created by the tree stumps is so severe that it becomes extremely difficult for the operator of a skidder to navigate it over the tree stumps to the landing where logs would be carried away in volume. Current skidders use manual transmissions with clutches and other mechanisms so that the operator, in addition to compensating for severe inputs to the steering mechanism, must shift gears to provide a practical speed through the field to the landing where the logs are delivered. This activity requires that the operator free a hand to shift the gear mechanism thus leaving only one hand on the steering mechanism. The problem of maintaining a proper speed is exacerbated by the fact that the operator is jostled so that the only way to maintain any sort of control is to depress the power lever or throttle to the floor so that the operator can be held in place in the operator seat in the cab.

Another problem with skidders is that the prime mover, or internal combustion engine, used to power the skidder also drives a hydraulic pump that powers various actuators employed to, among other tasks, grapple the log to be transported. It is essential that the engine RPM be high enough to provide sufficiently quick actuator response time to ease the burden on the operator while keeping the ground speed at an appropriate level in light of the terrain.

What is needed therefore is a propulsion system that reduces the adverse requirements on the operator of such skidder vehicles.

SUMMARY OF THE INVENTION

In one form, the invention is a skidder propulsion system having a prime mover providing a rotary output with a maximum governed RPM. A multiple gear ratio transmission is coupled to and receives the output from the prime mover. The transmission provides a rotary output to at least one set of wheels for the skidder. A device is provided for controlling the output of the prime mover up to the maximum governed RPM. A controller is provided for pre-selecting at least one of a maximum gear for the transmission and the governed maximum RPM of the prime mover to select a maximum skidder ground speed in response to movement of the output controlling device to a maximum output condition.

In another form, the invention is a skidder that includes a frame and a plurality of wheel sets mounted on the frame to enable ground movement. A prime mover providing a rotary output with a maximum governed RPM is mounted in the frame. A multiple gear ratio transmission is coupled to and receives the output from the prime mover. The transmission provides a rotary output to at least one set of the wheels for the skidder. An operator station is mounted to the frame and has a foot operated controller for varying the output of the prime mover up to the maximum governed RPM. A controller is provided for pre-selecting at least one of a maximum gear for the transmission and the governed maximum RPM of the prime mover so that a maximum skidder ground speed is maintained in response to movement of the foot operated controller to a maximum output condition.

DETAILED DESCRIPTION OF THE INVENTION

Figure 1:
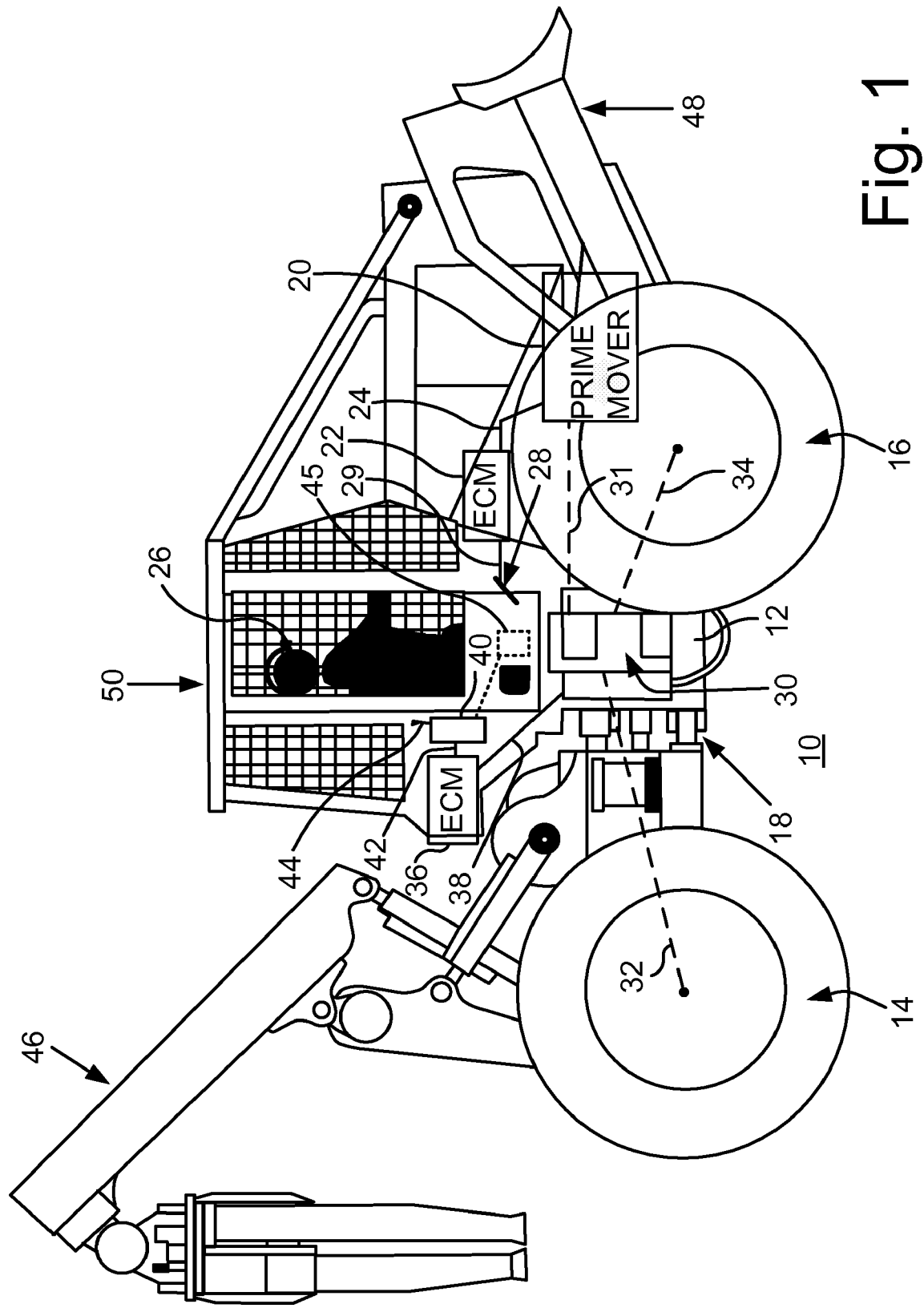
FIG. 1 is a side view of a skidder showing a schematic representation of the skidder propulsion system elements.

Referring now to FIG. 1, there is shown a skidder 10 having a frame 12 supporting a pair of wheel sets 14 and 16. Wheel sets 14 and 16 have appropriate mechanisms for differential application of torque to the wheels facing FIG. 1 and the wheels on the opposite side. Many different forms may be provided for steering, but in the skidder shown in FIG. 1, an articulated joint 18 is provided between the wheel set 14 and the wheel set 16. The wheel sets 14 and 16 ultimately receive their rotary torque input from a prime mover 20, shown schematically. Prime mover 20 may be any one of a number of devices to provide a controllable rotary torque output, but the usual type of prime mover 20 for this type of vehicle is a compression ignition for diesel engine. The diesel engine 20 operates on the principle that the heat of compression of air is sufficiently great to ignite a fuel charge that has been injected into individual cylinders in an appropriate quantity and timing to produce a desired power output.

A fuel system (not shown) for the prime mover 20 receives control inputs from an ECM 22 via appropriate control interconnections 24. The ECM 22 in current diesels uses sensors and other control inputs (not shown to simplify the understanding of the present invention) to operate the prime mover 20 at an appropriate RPM and torque output as demanded by an operator and modified for emissions or fuel economy considerations. The ECM 22 receives an input from an operator 26 via a foot actuated power lever 28, commonly referred to as an accelerator pedal and an appropriate interconnection 29, either mechanically or electrically. Alternatively, the power lever may be a hand operated lever or device.

The prime mover 20 provides a rotary torque output to a transmission 30 via driveshaft 31, indicated by a dashed line, that has a connection through appropriate output shafts represented by dashed lines 32 and 34 to wheel sets 14 and 16. It should be apparent to those skilled in the art that in the mechanical connection 32 and 34 to wheel sets 14 and 16. Appropriate differential mechanisms and braking mechanisms are employed in the wheel sets 14 and 16 to properly control the skidder 10.

The transmission 30 is a multiple gear ratio transmission having a plurality of forward and reverse ratios. Transmissions of the heavy duty type employ various hydromechanical and electrical methods for shifting gears and may utilize torque converters to allow the shifts to be smooth and efficient. The transmission 30 may be an automatic transmission having control and actuation mechanisms to change gears and uses a torque converter for startup and smooth gear changes. This type of transmission may also employ lockup mechanisms under certain conditions.

Another type of transmission 30 may be employed for skidder 10 is a semi-automatic transmission in which the gear ratio changes are made automatically, but a master clutch is used in place of a torque converter.

The transmission 30 may have any number of forward and reverse gear ratios. By way of non-limiting example, an automatic transmission may have 6 forward and three reverse gear ratios. The semi-automatic transmission may have 8 forward and 7 reverse gear ratios.

Either type of transmission 30 is controlled by an ECM 36 through a control line 38 which provides various control functions to enable selection of the most appropriate gear ratio for the conditions experienced by the skidder 10. The ECM 36 receives an input from an operator control mechanism 40 via line 42 to pre-select the maximum gear the transmission 30 would go into, in response to operator input via a lever 44. Operator control mechanism 40 may take many different forms, but, as shown, may be a mechanism that enables step-up or step-down incremental gear selections by movement of the operator lever 44. In another form shown by dashed line 45, operator control mechanism 40 may include a multiple position switch, push-button or dial to achieve the selection of the maximum attainable gear. The ECM 36 may be set up to a default maximum gear ratio, for example $6^{th}$ gear, thus enabling the operator 26 to bump up or down from that gear selection. The ECM 36 may also be programmed to remember previous maximum gear selections to set those as the default upon startup of the skidder 10.

In addition to selection of the maximum gear for transmission 30, the maximum governed RPM of prime mover 20 may also be pre-selected by an appropriate control input to ECM 22.

The skidder 10 has a grapple assembly, generally indicated by reference character 46, to secure a felled tree trunk to drag it out of the forest without have to leave the skidder to secure a chain to the tree as in earlier skidders. In addition, the skidder 10 may have a pusher blade 48 to move or carry branches or leaves out of the operating field. In addition, the skidder has a frame 50 surrounding the operator 26 to provide protection from falling debris.

The skidder 10, as stated previously, has a maximum ground velocity, usually governed by the terrain over which it is passing and the load, or size of a tree trunk it is carrying. With transmission 30 the operator 26 pre-selects a maximum gear attainable from transmission 30 by means of the lever 44. When the skidder 10 moves forward, the usual operation for an operator, owing to the extremely rough and rugged terrain over which it passes is to push the foot pedal 28 to the floor or to push the hand operated lever to maximum output. This allows the transmission 30 to make appropriate gear selections according to a predetermined logic up into the maximum limited speed as set by the maximum governed RPM of the prime mover 20. The ultimate result of this combination is that the operator selects the maximum ground speed in a binary fashion by pushing the hand lever to maximum or the foot pedal to the floor and is free to exert efforts to maintain the skidder 10 on a predetermined course, taking into consideration the terrain over which the skidder 10 passes.

The selection of the maximum attainable gear ratio for transmission 30, which has heretofore not been utilized in a commercial skidder, enables a significant increase in productivity and reduction in operator fatigue.

Having described the preferred embodiment, it will become apparent that various modifications can be made without departing from the scope of the invention as defined in the accompanying claims.

The invention claimed is:

1. A skidder propulsion system comprising:
a prime mover providing a rotary output with a maximum governed RPM;
a multiple gear ratio transmission coupled to and receiving the output from said prime mover, said transmission providing a rotary output to at least one set of wheels for said skidder;
a device for controlling the output of said prime mover up to said maximum governed RPM; and
a controller for pre-selecting at least one of a maximum gear for said transmission and the maximum governed RPM of said prime mover to select a maximum skidder ground speed in response to movement of said output controlling device to a maximum output condition.

2. The skidder propulsion system as claimed in claim 1, wherein said prime mover is a diesel.

3. The skidder propulsion system as claimed in claim 1, wherein said transmission provides an output to a pair of wheel sets.

4. The skidder propulsion system as claimed in claim 1, wherein said output controlling device is one of a foot operated lever and hand operated device.

5. The skidder propulsion system as claimed in claim 1, wherein said transmission has between six to eight gear ratios in forward.

6. The skidder propulsion system as claimed in claim 5, wherein said transmission has between three to seven gear ratios in reverse.

7. The skidder propulsion system as claimed in claim 1, wherein said controller for said transmission comprises a lever to increase or decrease the maximum gear selection.

8. The skidder propulsion system as claimed in claim 7, wherein said lever incrementally increases or decreases the maximum selected gear.

9. The skidder propulsion system as claimed in claim 1, wherein said transmission is one of an automatic and semi-automatic transmission.

10. The skidder propulsion system as claimed in claim 1, wherein said controller for said transmission includes one of a multiple position lever, push button and dial to increase or decrease the maximum gear selection.

11. A skidder comprising:
a frame;
a plurality of wheel sets mounted on said frame enable ground movement;
a prime mover providing a rotary output with a maximum governed RPM;
a multiple gear ratio transmission coupled to and receiving the output from said prime mover, said transmission providing a rotary output to at least one set of wheels for said skidder;
an operator station mounted to said frame and having an operator controlled device for varying the output of said prime mover up to said maximum governed RPM; and
a controller for pre-selecting at least one of a maximum gear for said transmission and the maximum governed RPM of said prime mover so that a maximum skidder ground speed in response to movement of said operator controlled device to a maximum output condition.

12. The skidder as claimed in claim 11, wherein said prime mover is a diesel.

13. The skidder as claimed in claim 11, wherein said transmission provides an output to a pair of wheel sets.

14. The skidder as claimed in claim 11, wherein said transmission has between six and eight gear ratios in a forward speed.

15. The skidder as claimed in claim 11, wherein said transmission has between three and seven gear ratios in reverse.

16. The skidder as claimed in claim 11, wherein said controller includes one of a lever, push-button and dial to increase or decrease the maximum gear ratio attainable by said transmission.

17. The skidder as claimed in claim 16, wherein the maximum gear for said transmission is incrementally increased and decreased.

18. The skidder propulsion system as claimed in claim 11, wherein said transmission is one of an automatic and semi-automatic transmission.

* * * * *